United States Patent [19]

Konig

[11] 3,866,031

[45] Feb. 11, 1975

[54] ANALOGUE FUNCTION GENERATOR

[75] Inventor: Ferdinand Konig, Seuzach, Switzerland

[73] Assignee: Sulzer Brothers Ltd., Winterthur, Switzerland

[22] Filed: Dec. 19, 1973

[21] Appl. No.: 426,115

[30] Foreign Application Priority Data

Dec. 20, 1972 Switzerland .................... 18598/72

[52] U.S. Cl. .................... 235/197, 235/193

[51] Int. Cl. .................... G06g 7/26

[58] Field of Search .......... 235/193, 180, 184, 194, 235/197

[56] References Cited

UNITED STATES PATENTS

| | | | |
|---|---|---|---|
| 2,913,181 | 11/1959 | Leeder | 235/197 X |
| 3,393,308 | 7/1968 | Cope | 235/194 X |
| 3,443,078 | 5/1969 | Noronha et al. | 235/180 UX |
| 3,652,843 | 3/1972 | Kurokawa et al. | 235/180 X |

*Primary Examiner*—Joseph F. Ruggiero
*Attorney, Agent, or Firm*—Kenyon & Kenyon Reilly Carr & Chapin

[57] ABSTRACT

The analogue function generator is constructed with a minimum of multipliers and adders to produce a polynomial function of two independent variables. One chain of multipliers is used to generate $x$ values while a second chain is used to generate $y$ values. The $x$ and $y$ values are multiplied and added in certain steps to produce an output value of high accuracy.

5 Claims, 3 Drawing Figures

ANALOGUE FUNCTION GENERATOR

This invention relates to an analogue function generator for generating polynomial functions of two independent variables.

Heretofore, various types of function generators have been known to generate polynomial functions of two independent variables. Generally, these function generators have relied on the use of multipliers, adders and scalers to carry out the required process. However, the number of multipliers required has been relatively large. As a result, the function generators have been relatively expensive to produce as well as relatively large.

Accordingly, it is an object of the invention to provide an analogue function generator of relatively inexpensive construction for generating polynomial functions of two independent variables.

It is another object of the invention to provide an analogue function generator which uses a limited number of multipliers.

It is another object of the invention to provide an analogue function generator which uses a minimum number of adders.

Briefly, the invention provides an analogue function generator for generating polynomial functions of two independent variables which may be used, for example, for calculating the enthalpy of steam from its pressure and temperature.

According to the present invention, the analogue function generator is constructed to generate a function of the form:

$$z = a_{oo} + a_{01}x + a_{02}x^2 + a_{03}x^3 \ldots + a_{0m}x^m + (a_{10} + a_{11}x + a_{12}x^2 \ldots + a_{1m}x^m) \cdot Y + (a_{20} + a_{21}x + \ldots + a_{2m}x^m) \cdot Y^2$$

$$\vdots$$

$$+ (a_{n0} + a_{n1}x + a_{n2}x^2 \ldots + a_{nm}x^m) \cdot Y^n,$$

where $m$ and $n$ are both greater than 1.

The function generator includes a means for generating signals representing $x^2, x^3 \ldots$ and $x^m$, $(m + 1)$ signal lines each arranged to carry respectively a reference signal and the signals representing $x, x^2, x^3 \ldots$ and $x^m$, $(m + 1)(n + 1)$ scalers of which $(n + 1)$ have their inputs connected to each signal line, $(n + 1)$ adders each having at least $(m + 1)$ inputs of which one is connected to the output of each of $(m + 1)$ of the scalers, all of which have their inputs connected to different signal lines, and $n$ multipliers each having one input connected to the output of a different one of $n$ of the adders, a second input connected directly or indirectly with a source of a signal representing $y$, and the output being connected directly or indirectly to the input of the remaining adder, whose output emits the output signals $z$.

The use of this arrangement allows the number of multipliers to be reduced considerably in comparison with the function generators of the prior art. This is advantageous because the multipliers are comparatively expensive, and also because the reduced number of multipliers allows greater accuracy.

Conveniently, the means arranged to generate the signals representing $x^2, x^3 \ldots$ and $x^m$ comprises a chain of $(m - 1)$ multipliers.

One embodiment includes a means constructed to generate signals representing $y^2, y^3 \ldots$ and $y^m$, and to supply such sugnals, together with a signal representing $y$, one to each of the second inputs of the $n$ multipliers. The outputs of the $n$ multipliers are directly connected to the input of the remaining adder. Conveniently, the means for generating the signals representing $y^2, y^3 \ldots$ and $y^n$ comprises a chain of $(n - 1)$ multipliers.

In a second embodiment, the second inputs of the $n$ multipliers are directly connected to the source of a signal representing $y$, and the outputs of the $n$ multipliers are connected in cascade configuration to the inputs of $n$ of the adders.

These and other objects and advantages of the invention will become more apparent from the following detailed description and appended claims taken in conjunction with the accompanying drawings in which:

The function generators shown in the Figures are all designed to provide functions of the form:

$$z = a_{00} + a_{01}x + a_{02}x^2 + a_{03}x^3 \ldots + a_{0m}x^m + (a_{10} + a_{11}x + a_{12}x^2 \ldots + a_{1m}x^m) \cdot Y + (a_{20} + a_{21}x + \ldots + a_{2m}x^m) \cdot Y^2$$

$$\vdots$$

$$+ (a_{n0} + a_{n1}x = a_{n2}x^2 \ldots + a_{nm}x^m) \cdot Y^n,$$

where $m$ and $n$ are both greater than 1. In all the illustrated embodiments, $m$ and $n$ are both equal to 4.

Figure 1:
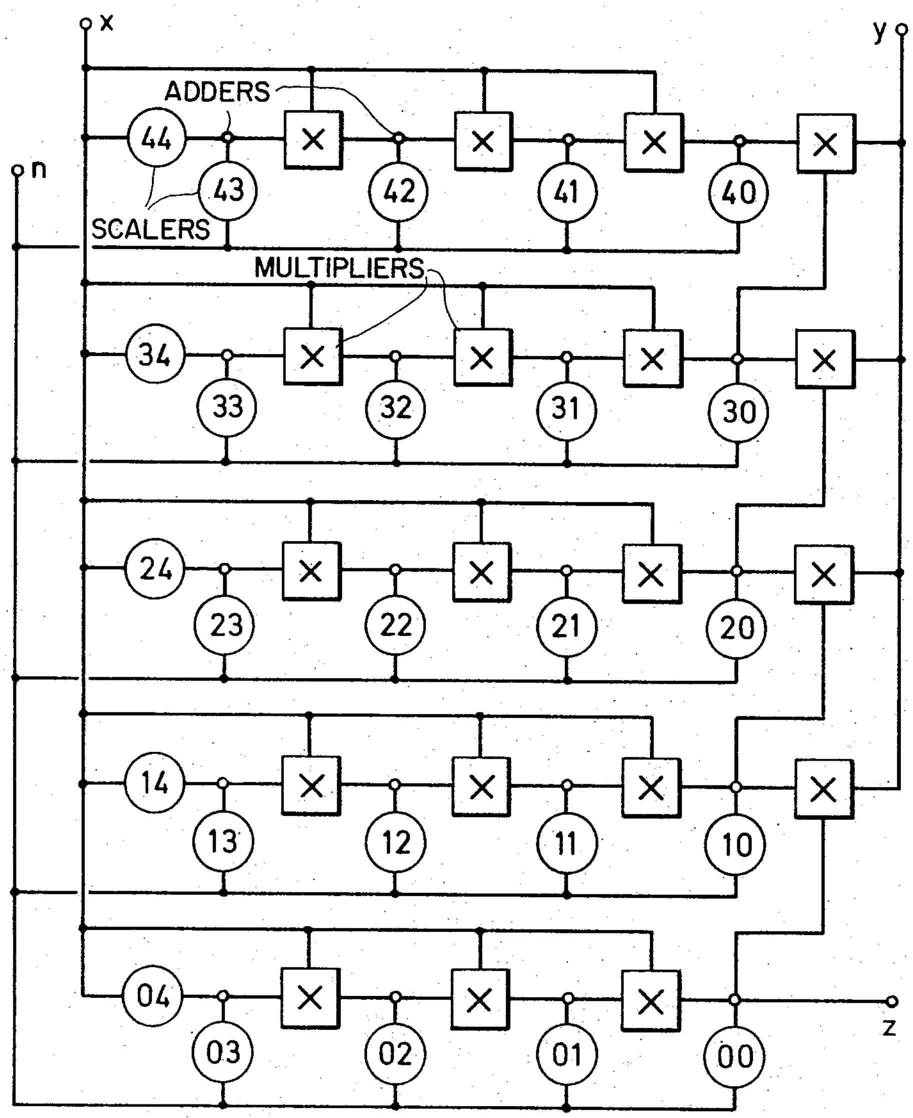
PRIOR ART FIG. 1
FIG. 1 illustrates a circuit diagram of a function generator of a known type.

Referring to FIG. 1, the known function generator receives input signals $x$ and $y$ at the terminals $x$ and $y$ respectively and also receives a unit reference signal at the terminal $n$. An output signal $z$ is provided at the terminal $z$. As shown, the large circles represent scalers whose scaling constants can be adjusted to equal the various coefficients $a$ in the equation above. The scalers can be potentiometers, for example. The numbers in the circles indicate which of the coefficients corresponds to a particular scaler. The small circles represent adders and the squares represent multipliers.

As shown, the adders and multipliers are arranged alternately in horizontal rows. The components in each horizontal row operate to generate the expression contained in the brackets in one of the lines of the equation above, by alternately adding one of the coefficients to the result obtained so far, and multiplying the result by $x$. A similar operation is performed on the outputs of the horizontal rows by the adders and multipliers at the right of the figure, as viewed which alternately add the result of one of the horizontal rows to the previous result and multiply the result by $y$. The final result $z$ is obtained when the result of the lowest horizontal row has been added in.

It will be seen that the number of multipliers required is $m(n + 1) - 1$, which is 19 in the illustrated case where both $m$ and $n$ equal 4.

Figure 2:
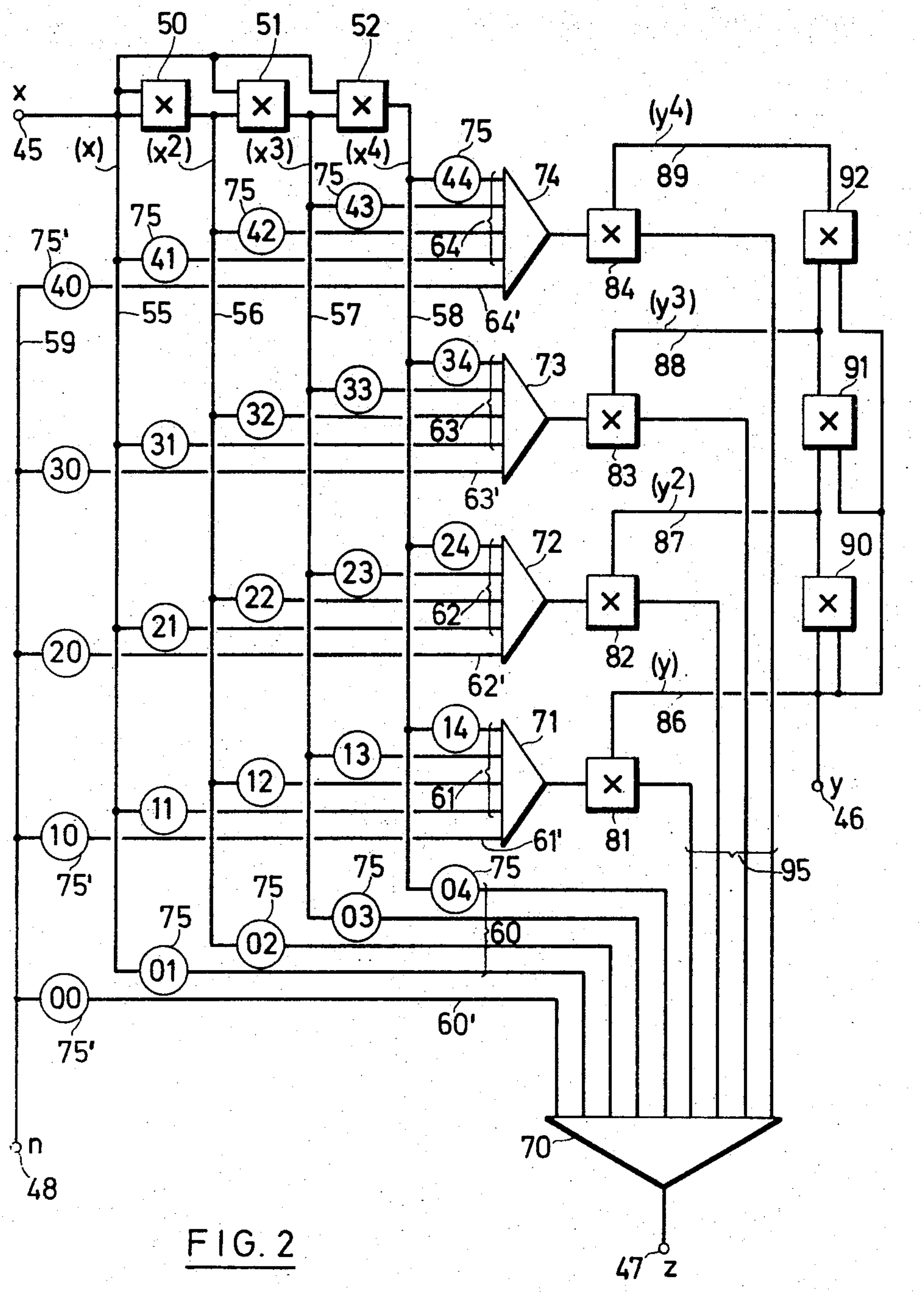
FIG. 2 illustrates a circuit diagram of a function generator embodying the invention.

Referring to FIG. 2, the function generator receives input signals $x$ and $y$ at terminals 45 and 46 respectively and also receives a unit reference signal $n$ at a terminal 48. The output signal $z$ is provided at a terminal 47.

This function generator has a means for generating signals $x, \ldots x^m$ such as a chain of three multipliers 50, 51, 52 connected to the terminal 45. Both inputs of the multiplier 50 are supplied with the signal $x$ so that this signal is multiplied by itself in the multiplier 50 and the product $x^2$ appears at the output of the multiplier 50. This product is supplied to one input of the next multiplier 51, the second input of which is supplied with the signal $x$. The product $x^3$ is therefore produced in the multiplier 51. In a similar manner, the product $x^4$ is formed in the multiplier 52.

Four signal distribution lines 55, 56, 57 and 58, which carry the signals $x$, $x^2$, $x^3$ or $x^4$, respectively, branch off from the chain of three multipliers 50 to 52. A signal distribution line 59 for the reference signal $n$ extends from the terminal 48 parallel to the four lines 55 and 58. Five groups of signal branch lines branch off the distribution lines 55 to 59. Each of these groups consists of five signal branch lines 60 and 60', 61 and 61', 62 and 62', 63 and 63', or 64 and 64', and each of the lines within a group is connected to a different one of the distribution lines 55 to 59. Each of the branch lines extends through a scaler 75 or 75' to an adder 70, 71, 72, 73 or 74 with all the branch lines within a group connected to the same adder.

As in the function generator indicated in FIG. 1, the scaling constant of each scaler is made equal to the corresponding coefficient $a$. The numbers in the circle representing each scaler indicate which of the coefficients corresponds to a particular scaler.

The arrangement as described so far will provide five signals at the inputs of each of the adders 71 to 74 corresponding to the terms within one of the brackets of the equation above. Therefore, the output of each of the adders 71 to 74 will correspond to the complete expression within one of the brackets. It will be seen that the expressions within brackets in the second to fifth lines of the equation (for $m = n = 4$) are represented by the outputs of the adders 71 to 74, respectively.

A means for generating signals $y, \ldots y^n$ such as a chain of three multipliers 90, 91, and 92 is connected to the terminal 46 and operates in a similar manner to the chain of multipliers 50, 51 and 52 to generate signals corresponding to $y^2$, $y^3$ and $y^4$, respectively. The signals from the terminal 46 and the multipliers 90, 91 and 92 are then supplied over signal lines 86 to 89 respectively to one input of multipliers 81 to 84, respectively. Since the other inputs of the multiplers 81 to 84 are connected to the outputs of the adders 71 to 74, respectively, the outputs of the multipliers 81 to 84 represent the complete expressions in the second to fifth lines of the equation above. The outputs of the multipliers 81 to 84 are connected by lines 95 to four further inputs of the adder 70. Since the five previously-mentioned inputs of the adder 70 receive signals corresponding to the terms in the first line of the equation, the output of the adder 70 represents $z$.

It will be seen that the number of multipliers required is $(m + 2n - 2)$, which is 10 in the present case wherein both $m$ and $n$ equal 4.

Figure 3:
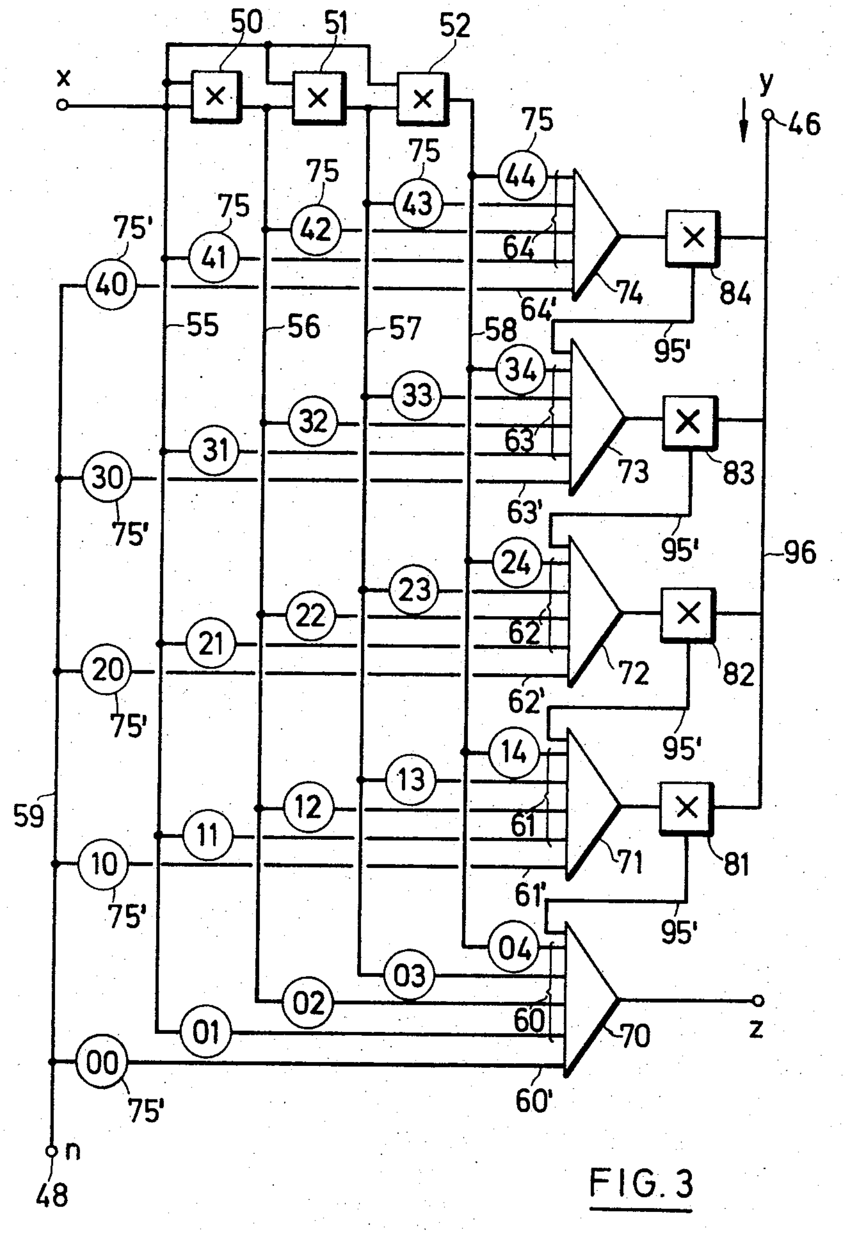
FIG. 3 illustrates another embodiment of a function generator according to the invention.

Referring to FIG. 3, wherein like reference characters indicate like parts as above, the function generator includes multipliers 50, 51 and 52, lines 55 to 59, scalers 75 and 74', lines 60 to 64, 60' to 64' and an adder 74 identical to those in FIG. 2. Thus, the adder 74 provides an output corresponding to the expression within brackets in the last line of the equation above. However, the adders 70 to 73 differ from those in FIG. 2 in each having one input line 95' in addition to the lines 60 to 64, 60' to 64'.

The signal $y$ at the terminal 46 is supplied over a line 96 to one input of each of four multipliers 81 to 84. The other inputs of the multipliers 81 to 84 are coupled to the output of the adders 71 to 74 respectively and the outputs of the multipliers 81 to 84 are connected to the inputs 95' of the adders 70 to 73, respectively. Thus, the multipliers 81 to 84 and the adders 70 to 73 form a chain in which the result previously obtained is alternately multiplied by $y$, and added to the terms contained within one of the brackets of the equation.

The output of the adder 70 then gives the required function $z$.

It will be seen that the number of multipliers required is $(m + n - 1)$, which is 7 in the present case where both $m$ and $n$ equal 4.

What is claimed is:

1. An analogue function generator for generating a function of the form $$z = a_{00} + a_{01}x + a_{02}x^2 + a_{03}x^3 \ldots + a_{0m}x^m + (a_{10} + a_{11}x + a_{12}x^2 \ldots + a_{1m}x^m) \cdot Y + (a_{20} + a_{21}x + \ldots + a_{2m}x^m) \cdot Y^2$$

$$\vdots$$

$$+ (a_{n0} + a_{n1}x + a_{n2}x^2 \ldots + a_{nm}x^m) \cdot Y^n,$$

wherein $m$ and $n$ are both greater than 1, comprising means for generating signals representing $x^2$, $x^3 \ldots$ and $x^m$, $(m + 1)$ signal lines each arranged to carry respectively a reference signal and the signals representing $x$, $x^2$, $x^3 \ldots$ and $x^m$, $(m + 1) \cdot (n + 1)$ scalers of which $(n + 1)$ have inputs connected to each signal line, $(n + 1)$ adders each having at least $(m + 1)$ inputs of which one of said is inputs connected to the output of each of $(m + 1)$ of said scalers, all of said scalers having their inputs connected to different signal lines, and $n$ multipliers each having one input connected to the output of a different one of $n$ of said adders, a second input connected with a source of a signal representing $y$ and an output connected to the input of the remaining adder, said remaining adder having an output for emitting an output signal $z$.

2. A function generator as set forth in claim 1 in which said means for generating signals representing $x^2$, $x^3 \ldots$ and $x^m$ comprises a chain of $(m - 1)$ multipliers.

3. A function generator as set forth in claim 1 which further comprises means for generating signals representing $y^2$, $y^3 \ldots$ and $y^n$, and for supplying said signals, together with a signal representing $y$, one to each of said second inputs of said $n$ multipliers, said outputs of said $n$ multipliers being directly connected to said input of said remaining adder.

4. A function generator as set forth in claim 3 wherein said means for generating said signals representing $y^2$, $y^3 \ldots$ and $y^n$ comprises a chain of $(n - 1)$ multipliers.

5. A function generator as set forth in claim 1 wherein said second inputs of said $n$ multipliers are directly connected to the source of a signal representing $y$ and said outputs of said $n$ multipliers are connected in cascade configuration to said inputs of $n$ of said adders.

* * * * *